Patented Oct. 3, 1922.

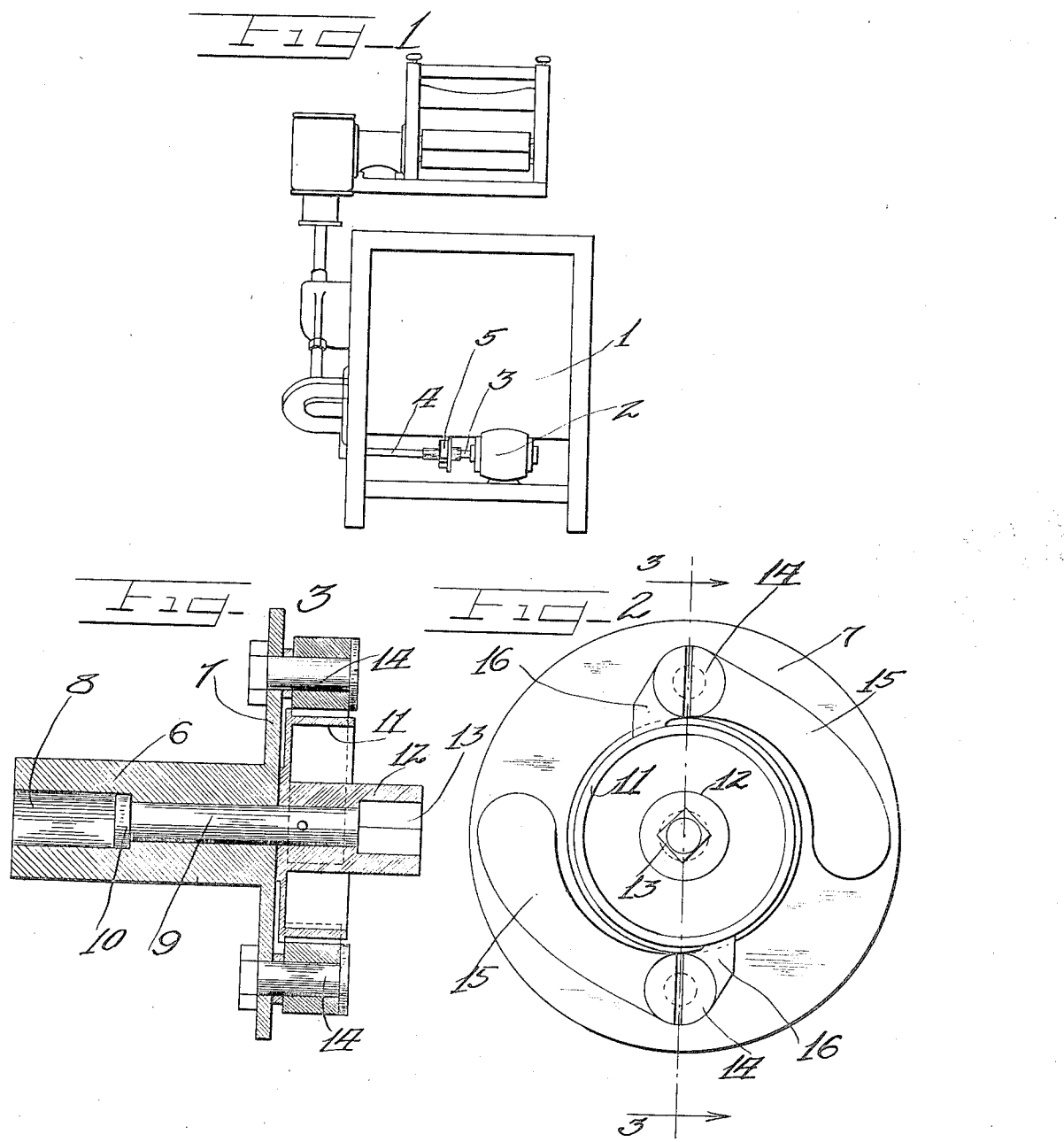

1,430,689

UNITED STATES PATENT OFFICE.

ALFRED H. SCHROEDER AND ROWLAND H. BOONE, OF ALTON, ILLINOIS, ASSIGNORS, BY MESNE ASSIGNMENTS, TO GILLESPIE EDEN CORPORATION, A CORPORATION OF DELAWARE.

FRICTION CLUTCH.

Application filed June 28, 1920. Serial No. 392,176.

*To all whom it may concern:*

Be it known that we, ALFRED H. SCHROEDER and ROWLAND H. BOONE, citizens of the United States, and residents of the city of Alton, in the county of Madison and State of Illinois, have invented certain new and useful Improvements in Friction Clutches; and we do hereby declare that the following is a full, clear, and exact description of the same, reference being had to the accompanying drawings, and to the numerals of reference marked thereon, which form a part of this specification.

This invention relates to an improved type of friction clutch which is devoid of springs and is provided with centrifugally operating mechanism disposed in a balanced relation upon one of the elements of the clutch to co-act with another element thereof to transmit a friction drive therebetween and so arranged as to obviate the possibility of distortion stresses being set up in the clutch element due to the centrifugal effect upon the members when in operation.

It is an object therefore of this invention to provide a centrifugal friction clutch wherein centrifugally operating members are disposed in the plane of rotation of the driving element so as to relieve the same of distortion stresses, and serving effectively to impart a frictional drive at and beyond predetermined speeds, to a driven element.

Other and further important objects of this invention will be apparent from the disclosures in the specification and drawings.

The invention (in a preferred form) is illustrated in the drawings and hereinafter more fully described.

*Drawings.*

Figure 1 is an elevation of a conventional type of washing machine equipped with a clutch embodying the principles of this invention.

Figure 2 is an end view of the clutch detached.

Figure 3 is a central vertical section taken through the clutch on line 3—3 of Figure 2.

*Description.*

The reference numeral 1 indicates as a whole a washing machine equipped with an electric driving motor 2. The motor shaft is denoted by the reference numeral 3 and is adapted to impart a drive to a driven shaft 4 axially aligned therewith. The drive from the shaft 3 to the shaft 4 is accomplished through a centrifugal type of friction clutch denoted as a whole by the reference numeral 5.

As shown in detail in Figures 2 and 3, a shaft member 6 is provided having a circular plate 7 secured thereon or integral therewith, and said shaft member 6 is cored out on its interior as denoted by the reference numeral 8 to receive the motor driving shaft 3 engaged therein and secured thereto in any suitable manner. Journalled within the shaft member 6 is a short shaft 9 of reduced diameter and prevented from movement therethrough in one direction by its head 10, and secured in any suitable manner upon the projecting end of the shaft 9 is a friction wheel 11 having a long hub extension 12, which is provided with a cored-out and squared portion 13 to receive the driven shaft 4 engaged therein. Said short shaft 9 holds the friction wheel member 11 associated with the driving shaft member 6 and circular plate portion 7.

A pair of pivot bolts 14 are provided in the circular plate 7, and journalled on each thereof is a centrifugally acting arm, the weighted portion of which is denoted by the reference numeral 15, and the frictional bearing portion for engagement with the wheel 11 is denoted by the reference numeral 16.

The operation of the friction clutch is obvious. When rotation is imparted to the shaft member 6 and circular plate portion 7 by the driving shaft 3, the eccentrically pivoted weighted arms 15 tend to swing outwardly, but by very slight movement thereof serve to move the bearing portions 16 thereof into contact with the peripheral surface of the frictional wheel 11, which is secured upon the driven shaft 4. The parts of the clutch are held assembled to one another by the short shaft 9, which is journalled within the shaft member 6 and has secured thereon the driven friction wheel 11 so that the clutch may be readily assembled as a unit with other mechanisms.

Of course, the greater the speed of rotation of the driving member 6—7 of the clutch, the greater the frictional effect of the weighted arms upon the driven friction wheel 11. In the event of any damage occurring to the mechanisms which are driven through the clutch, to overload the driving motor 2, the friction members 16 will slide upon the friction wheel 11, preventing injury to the driving motor.

We are aware that numerous details of construction may be varied through a wide range without departing from the principles of this invention, and we therefore do not purpose limiting the patent granted otherwise than necessitated by the prior art.

*Claim.*

In a device of the class described, a driving shaft, a driven shaft, a clutch member having a shouldered bore secured upon one of said shafts, a second clutch member having a bore secured upon the other of said shafts, a pin having a head designed to fit against the shoulder in the bore of the first clutch member and having its stem designed to extend into the bore of the other clutch member, and means adapted to secure said pin to said second clutch member.

In testimony whereof, we have hereunto subscribed our names in the presence of two subscribing witnesses.

ALFRED H. SCHROEDER.
ROWLAND H. BOONE.

Witnesses:
V. M. ROWAN,
W. R. KING.